United States Patent
Batta

(10) Patent No.: US 8,612,752 B2
(45) Date of Patent: Dec. 17, 2013

(54) COMMUNICATING A PACKET FROM A MESH-ENABLED ACCESS POINT TO A MESH PORTAL IN A MULTI-HOP MESH NETWORK

(75) Inventor: Puneet Batta, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1394 days.

(21) Appl. No.: 12/261,872

(22) Filed: Oct. 30, 2008

(65) Prior Publication Data

US 2010/0115272 A1    May 6, 2010

(51) Int. Cl.
*H04K 1/00* (2006.01)
*H04L 9/00* (2006.01)

(52) U.S. Cl.
USPC ........... 713/162; 713/153; 713/164; 713/163; 380/277; 380/239; 380/270

(58) Field of Classification Search
USPC ............ 713/162, 163; 726/5, 7; 380/162, 163
See application file for complete search history.

(56) References Cited

U.S. PATENT DOCUMENTS

| | | | | |
|---|---|---|---|---|
| 5,070,528 A | * | 12/1991 | Hawe et al. | 713/161 |
| 2007/0043940 A1 | * | 2/2007 | Gustave et al. | 713/150 |
| 2008/0016338 A1 | * | 1/2008 | Sun | 713/163 |

OTHER PUBLICATIONS http://www.cisco.com/en/US/docs/wireless/controller/7.0MR1/configuration/guide/cg_mesh.pdf "Controlling Mesh Access Points"—Cisco, Sep. 2007.*
http://www.caworldwifi.com/files/downloads/MESH%20AP%20user%20manual.pdf CAWORLDWIFI, Sep. 2008.*

* cited by examiner

*Primary Examiner* — Krista Zele
*Assistant Examiner* — Randy Scott

(57) ABSTRACT

Methods are provided for processing a packet received by a mesh-enabled access point (MAP). When a first MAP receives a packet it can determine whether the packet is destined for a mesh portal based on the destination address. If so, the first MAP can retrieve an encryption key corresponding to the mesh portal, use the encryption key to encrypt the packet and set a mesh forwarding flag in the packet to indicate that the packet is destined for a mesh portal, and is encrypted with an encryption key corresponding to the mesh portal, and then forward the packet to the next hop MAP towards the a mesh portal. The mesh forwarding flag indicates that the packet is destined for a mesh portal, is encrypted with an encryption key corresponding to the mesh portal, and is to be forwarded to the next hop MAP without performing decryption/re-encryption processing on the packet. When a MAP receives a packet, the first MAP it determines whether a mesh forwarding flag is set in the packet. When the mesh forwarding flag is set in the packet, the first MAP skips decryption/re-encryption processing of the packet, and forwards the packet to the next hop MAP towards the mesh portal. When the mesh forwarding flag is not set in the packet, the first MAP retrieves an encryption key corresponding to the mesh portal, encrypts the packet using the encryption key, sets a mesh forwarding flag in the packet and forwards the packet to the next hop MAP.

8 Claims, 5 Drawing Sheets

COMMUNICATING A PACKET FROM A MESH-ENABLED ACCESS POINT TO A MESH PORTAL IN A MULTI-HOP MESH NETWORK

FIELD OF THE INVENTION

The present invention generally relates to network communications, and more particularly relates to communications between a mesh-enabled access point and a mesh portal.

BACKGROUND OF THE INVENTION

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network.

One characteristic of the nodes is that each node can directly communicate over a short range with nodes that are within communication range or "a single hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through communication with neighboring nodes. The routing information can also be periodically broadcast in the network to reflect the current network topology. Alternatively, to reduce the amount of information transmitted for maintaining accurate routing information, the network nodes may exchange routing information only when it is needed.

A wireless mesh network can be formed by a collection of wireless nodes or devices organized in a decentralized manner to provide range extension by allowing the nodes to communicate "over or across" multiple hops. In a multi-hop network, communication packets sent by a source node can be relayed through one or more intermediary nodes before reaching a destination node. A large wireless mesh network can be realized using mesh-enabled access points (MAP) which provide wireless nodes with access to a wired backhaul. A wireless mesh network can include both routable or "mesh" nodes and non-routable or "non-mesh" nodes. Mesh or "routable" devices or "nodes" may operate in compliance with a proprietary wireless protocol. These devices can forward packets to/from devices which are associated with them. Non-mesh or "non-routable" WLAN-enabled nodes are devices that do not have routing functionality and do not participate in any kind of routing, such as those complying with a proprietary wireless mesh networking protocol or a standard wireless protocol such as Institute of Electrical and Electronics Engineers (IEEE) 802.11 802.11 a, b, e, g. As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA. Any of the IEEE standards or specifications referred to herein are incorporated by reference herein their entirety.

Although a network can be made up of just MAPs communicating among themselves, with no connection to a wired network, one useful configuration includes a special type of MAP known as a mesh portal (MP) that has a wired connection. MAPs are wirelessly "meshed" together to form a mesh network of MAPs that also includes a mesh portal. This allows other nodes, including non-mesh 802.11 stations, to associate with a MAP and to communicate packets through intermediate MAPs on the way to their ultimate destination. Because the mesh portal (MP) has a wired connection to infrastructure and is meshed with the other MAPs, the wired network is in effect wirelessly extended to each MAP. Nodes can transmit/receive packets hop-by-hop over the mesh network of intermediate MAPs so that distant stations can communicate with the mesh portal (MP). This way nodes can communicate with other infrastructure network entities that the mesh portal is coupled to via its wired connection.

Many wireless mesh networks use cryptographic techniques to transmit data securely from one location in a network to another location in the network. Encryption is used in wireless mesh networks to secure communication between MAPs that communicate over-the-air (OTA). For example, a MAP can encrypt information using a cipher or encryption algorithm and an encryption key. A secret encryption key can be used to encode information using the encryption algorithm, and the encrypted information can then be transmitted securely toward its destination. In order to decode the encrypted information, the destination MAP must use the same secret encryption key that was used to encrypt the information and apply a cipher or decryption algorithm.

In symmetric or "secret-key" type cryptographic systems, symmetric key algorithms use identical encryption and decryption keys to encrypt and decrypt the information. Thus, to exchange enciphered data a single key value must be shared between the originator and the recipient.

In asymmetric or "public-key" type cryptographic systems, asymmetric key exchange (AKE) algorithms use separate public and private keys. Existing asymmetric key exchange algorithms include, for example, Diffie-Hellman, Rivest, Shamir, and Adelman (RSA), Digital Signature Algorithm (DSA), ElGamal, and Elliptic Curve Cryptography (ECC). In such asymmetric cryptographic systems, a single operation is used to generate the pair of public and private keys. The public key can be made publicly available and can be safely shared with all nodes including the other MAP that will participate in a secure communication. The private key is kept secure or secret by the MAPs that share the key pair. To exchange encrypted data each MAP to the exchange makes their public key available, and keeps their private key secret. The keys are typically different from each other, but neither key can be deduced from the other. Because the private key needs to be kept only by one MAP, it never needs to be transmitted over any potentially compromised networks. Two MAPs can generate symmetric private keys through the exchange of public keys. The two MAPs agree beforehand on the exact algorithm to use, and each MAP then selects a random number as a private key and uses the algorithm and the random number to generate a public key. The two MAPs exchange public keys and then each generates a session key using their own private key and the other MAP's public key. Even though neither MAP knows the other MAP's private key, both MAPs' session keys are identical. Data enciphered by using one key of the pair may be deciphered using the other key of the pair. The originator MAP enciphers the data using the public key of the recipient MAP. The recipient MAP is then able to decipher the received data using his own private key. A third party intercepting the public keys but lacking knowledge of either private key cannot generate a session key. Therefore, data can be securely encrypted with the session key. Because one key pair is associated with one MAP, even on a large network, the total number of required keys is much smaller than in the symmetric case. Although AKE methods are convenient compared with alternatives such as manual key loaders, they are relatively slow because they are computationally intensive and because of the large keys needed for good security. To avoid this speed penalty, some secure MAPs use AKE only to establish the public key (shared by both MAPs) and then revert to fast symmetric-key encryption algorithm such as the Advanced Encryption Standard (AES) to encrypt and decrypt the traffic. Because AKE is relatively slow, it noticeably delays communication particularly in a wireless mesh network where data is transmitted over multiple hops between a source MAP and a destination node.

It is desirable to avoid unnecessary encryption, decryption and re-encryption that occurs when communicating information between MAPs since this can reduce delays typically associated with such secure communications over a wireless mesh network. Other desirable features and characteristics of the present invention will become apparent from the subsequent detailed description and the appended claims, taken in conjunction with the accompanying drawings and the foregoing technical field and background.

BRIEF SUMMARY

According to one exemplary embodiment, methods are provided for processing a packet received by a mesh-enabled access point (MAP).

In one embodiment, when a first MAP receives a packet it reads a source address of the packet and can determine whether the packet is from a known mesh node that the first MAP has previously discovered. When the first MAP determines that the packet is not from a known mesh node, the first MAP can determine whether the packet is destined for a mesh portal based on the destination address. If so, the first MAP can retrieve an encryption key corresponding to the mesh portal, use the encryption key to encrypt the packet, set a mesh forwarding flag in the packet to indicate that it is destined for a mesh portal and then forward the packet to a next hop MAP towards the mesh portal. In one implementation, the mesh forwarding flag comprises: information regarding a preferred route to a mesh portal including a next hop MAP, and information which indicates that the packet is destined for a mesh portal and is encrypted with an encryption key corresponding to the mesh portal, and is to be forwarded to the next hop MAP without performing decryption/re-encryption processing on the packet.

In another embodiment, when the first MAP receives a packet, the first MAP it determines whether a mesh forwarding flag is set in the packet. When the mesh forwarding flag is set in the packet, the first MAP skips decryption/re-encryption processing of the packet, and forwards the packet to the next hop MAP towards the mesh portal. When the mesh forwarding flag is not set in the packet, the first MAP retrieves an encryption key corresponding to the mesh portal, encrypts the packet using the encryption key corresponding to the mesh portal, sets a mesh forwarding flag in the packet to indicate that it is destined for the mesh portal, and forwards the packet to the next hop MAP towards the mesh portal, which then forwards the packet to the next hop MAP without performing decryption/re-encryption processing on the packet.

Other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
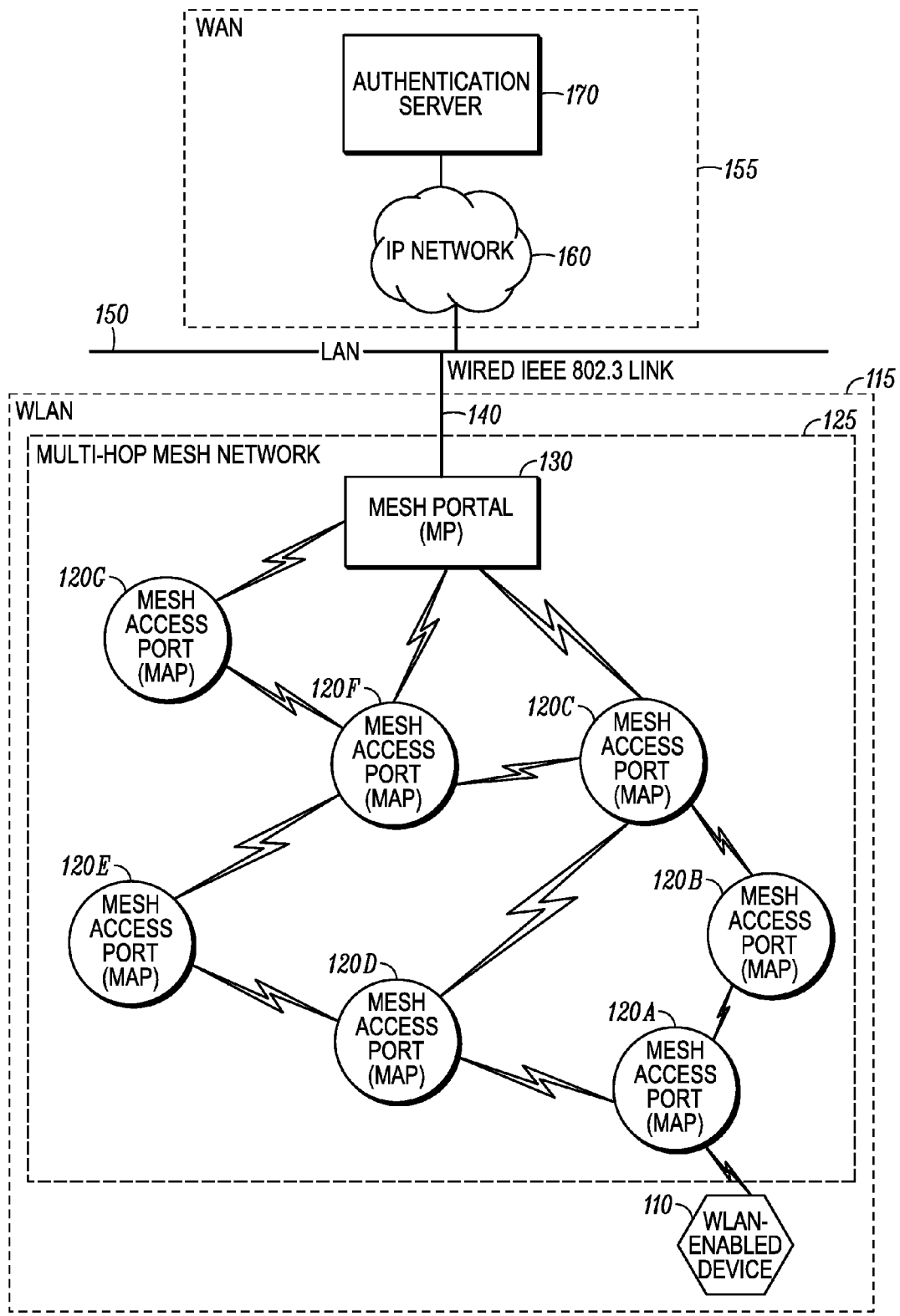
FIG. 1 illustrates an exemplary network.

The following detailed description of the invention is merely exemplary in nature and is not intended to limit the invention or the application and uses of the invention. Furthermore, there is no intention to be bound by any theory presented in the preceding background of the invention or the following detailed description of the invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Before describing in detail embodiments that are in accordance with the present invention, it should be observed that the embodiments reside primarily in combinations of method steps and apparatus components related to processing a packet received by a mesh-enabled access point (MAP) that is destined for a mesh portal (MP). Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for processing a packet received by a mesh-enabled access point (MAP) that is destined for a mesh portal (MP) described herein. The non-processor circuits may include, but are not limited to, a radio receiver, a radio transmitter, signal drivers, clock circuits, power source circuits, and user input devices. As such, these functions may be interpreted as steps of a method for processing a packet received by a mesh-enabled access point (MAP) that is destined for a mesh portal (MP). Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Prior to discussing example embodiments in accordance with the present invention, an exemplary network and mesh node will be described with reference to FIGS. 1 and 2.

FIG. 1 illustrates an exemplary communication network 100. The network 100 includes a WLAN 115, a local area network (LAN) 150, a wide area network (WAN) 155 that includes an IP network 160 and an optional authentication server 170. The WLAN 115 is coupled to the LAN 150 by a wired IEEE 802.3 link 140.

The WLAN 115 includes a mobile non-mesh WLAN-enabled device 110, and a multi-hop mesh network 125 that includes a plurality of wirelessly connected mesh nodes. The multi-hop mesh network 125 can be a mesh enabled architecture (MEA) network, an IEEE 802.11 network (i.e. 802.11a, 802.11b, 802.11g, 802.11e, 802.11n or 802.11s), or any other wireless mesh communication network.

The non-mesh WLAN-enabled device 110 is not part of the multi-hop mesh network 125 since it does not participate in a mesh protocol and does have routing capability. The non-mesh WLAN-enabled device 110 is a non-mesh or non-routable device that can join the network through their associated access point, which can be either a mesh-enabled access point (MAP) or a special type of MAP, called a mesh portal, which has a wired network connection. When the non-mesh WLAN-enabled device 110 communicates with a MAP, the non-mesh WLAN-enabled device 110 is not aware or does not realize that it is communicating with a MAP that is part of or connected to the multi-hop mesh network 125, but simply thinks that it is associated with and communicating with a regular AP that has a wired connection infrastructure. Thus, in contrast to a mesh point (MP) described in the IEEE 802.11s specifications, the non-mesh WLAN-enabled device 110 does not have all of the same capabilities as an 802.11s mesh point (MP) since it does not support mesh communications.

As used herein, the term "mesh node" refers to an access point device which has mesh routing capability. A mesh node can be a mesh-enabled access point (MAP) or mesh portal (MP), where a mesh portal (MP) is a mesh-enabled access point that has a wired network connection to infrastructure. As used herein, the term "mesh-enabled access point (MAP)" refers to any type of access point that is designed to establish and maintain mesh communication links with other mesh nodes, has mesh routing capability and can perform forwarding and/or relaying and/or repeating and/or routing for other wireless LAN enabled communication devices including non-mesh nodes or wireless LAN enabled communication devices. MAPs can route packet(s), including packet(s) generated by a non-mesh or non-routable device associated with it, to the correct remote destination which can be a routable or another non-routable device. A MAP communicates over wireless mesh network interfaces with other devices and can act as an access point for those devices. A MAP is distinguishable from a regular AP in that a MAP implements a mesh routing protocol, such as the Mesh Scalable Routing (MSR) protocol disclosed in U.S. Pat. No. 7,061,925 B2, entitled "System and Method for Decreasing Latency in Locating Routes Between Nodes in a Wireless Communication Network" assigned to the assignee of the present invention, its contents being incorporated by reference in its entirety herein. As will be appreciated by those skilled in the art, mesh routing protocols can be used to create routes through a mesh network using both proactive routing and/or on-demand routing. In proactive routing, a Mesh Portal (MP) can be configured as a network root. The network root MP sends periodic portal announcement messages that are forwarded hop by hop through the network, and waits to hear announcement messages from other MAPs or mesh portals. Each MAP creates a tree-structured routing table based on metrics from the root announcement messages received from neighboring MAPs. By contrast, on-demand routing can be used to find a destination node when there is no proactive route to the destination node. A source MAP sends requests for the destination node to neighboring MAPs. The requests are forwarded along until one reaches the destination node, at which time the destination node then sends a response that is forwarded back to the source MAP. Radio Metric Ad Hoc On Demand Distance Vector routing (RM-AODV) can be used to choose among the possible paths.

In addition to having wireless mesh interfaces to other MAPs, a mesh portal (MP) is a mesh-enabled access point (MAP) which has a wired network interface and is coupled to wired connection. A mesh portal (MP) provides other devices with a path for packets to a wired network and possibly with access to a wide area wired network (WAN) and other network appliances (e.g., servers, gateway devices, etc.) that are part of the WAN. A mesh portal (MP) can relay packets between the wireless devices and the wired devices on the wired network or WAN. Thus, a network of MPs and MAPs can enable communication between the wired network and remote wireless nodes which are multiple hops away from the wired network.

The exemplary multi-hop mesh network 125 is illustrated as including one mesh portal (MP) 130 and a plurality of mesh-enabled access points (MAPs) 120; however, it will be appreciated that more than one mesh portal may be present and that additional or fewer MAPs 120 can be present in a particular multi-hop mesh network.

The MAPs 120 are communication devices that can be fixed or mobile. The MAPs 120 are capable of communicating with each other directly or indirectly. When communicating indirectly, the MAPs 120 can operate as routers that forward or relay packets being sent between nodes. Routing functionality provided in the MAPs 120 allows the MAPs to determine the path of least resistance through a mesh network 125. In some cases, this can be the path characterized by the least number of hops to the destination.

The mesh portal 130 has a connection 140 to a wired network, such as a wired 802.3 link. The mesh portal 130 provides other nodes in the WLAN 115 with access to LAN 150 and WAN 155. Although not illustrated, the IP network 160 can include, for example, a plurality of servers and gateway routers to provide network nodes with access to other networks, such as other ad-hoc networks, a public switched telephone network (PSTN) and the Internet.

Each of the MAPs 120A-120G regularly exchange routing information and switching table information with all peer/neighbor mesh-enabled access points (MAPs) and mesh portals (MPs) that the MAP has discovered (e.g., associated and authenticated with, and established a security association with). Each mesh node stores a list of known mesh nodes that the first MAP has previously discovered and/or associated with. A known mesh node can be either a MPP or another MAP that the first MAP has previously discovered and/or associated with and has established encryption keys with. A particular MAP may also have performed an IEEE 802.11 authentication and association with one or more non-mesh WLAN-enabled devices (NMWEDs) communicating through that MAP, and stored a list of information associated with those NMWEDs. This way a MAP, upon receiving a packet, can determine, based on a source MAC address of the packet, whether the packet was transmitted from another MAP, mesh portal or other non-mesh device, whether source of the packet is another MAP, mesh portal or other non-mesh device, whether the packet is destined for another MAP, mesh portal or other non-mesh device, etc.

Mesh networks add complexity to the process of establishing secure access because MAPs maintain paths to many neighboring nodes, not just to a single AP. To address this, each pair of mesh nodes (MAPs, mesh portals) in a mesh network can establish a unique security association with each of its neighbor MAPs (including mesh portals) that can help to provide for secure communications between those nodes. As used herein, the term "security association" refers to a set of policy(ies) and encryption key(s) used to protect information. At a minimum, each security association includes encryption keys for encrypting mesh communication links or hops between the MAPs so that communications between MAPs can be encrypted. A security association can comprise information regarding, for example, key material (e.g., cryptographic keys), type of encryption/decryption or cipher algorithm, key length, MAC algorithm, counters, timers, etc. needed for correct operation. For example, components of a security association in the context of IEEE 802.11i can include: a pairwise master key (PMK) which is derived during EAP authentication between the Supplicant and the Authentication Server (e.g., derived from the 802.11x/EAP exchange), a pairwise transient key (PTK) which is derived between peer nodes using the PMK during an IEEE 802.11i 4-way handshake, and a group transient key (GTK) which is derived during an 802.11i 2-way handshake or optionally piggybacked on 4-way handshake as defined in 802.11i using the PMK. The security associations for each of the PMK, PTK and GTK include key material, cipher algorithm, counters, timers, etc.

In the exemplary network of FIG. 1, each MAP 120 has a unique pair of encryption keys that it shares with the mesh portal 130 for encrypting and decrypting communications transmitted and received between the particular MAP and the mesh portal 130, and each pair of MAPs shares a unique pair of encryption keys with its neighbor MAPs for encrypting and decrypting communications transmitted and received between that particular pair of MAPs. The encryption keys can be any known type of encryption keys including, for example, pre-configured keys, public-keys, etc. For example, in one implementation, the keys can be pairwise-master-keys (PMKs) from which multiple session keys (PTKs) are derived. In other implementations, the encryption keys can be based on a public-private key pair. The encryption keys shared between any two MAPs can be provisioned on the nodes or derived by the nodes using any known techniques. In some implementations, the encryption keys can be manually pre-placed, pre-loaded or pre-configured on the MAPs and mesh portals, for example, a system administrator. In other implementations, the encryption keys can be derived by a particular MAP and another MAP (or mesh portal) after discovery using any techniques known to those skilled in the art. For instance, in one exemplary implementation, MAPs can use protocols specified in the IEEE 802.11i and 802.11X standards to negotiate parameters and encryption key pairs with each neighbor MAPs. In another exemplary implementation, MAPs can negotiate encryption keys when they discover each other using, for example, an authenticated-Diffie-Hellman protocol.

In a conventional mesh network, when a MAP receives a packet, the MAP determines what the next hop MAP is and encrypts the payload/data portion of the packet using an encryption key shared with the next hop MAP, and then transmits the packet to the next hop MAP. For example, when MAP 120A receives a packet from the WLAN enabled client device 110 that is destined for the mesh portal 130 (or alternatively infrastructure coupled to the mesh portal 130), the MAP 120A determines what the next hop MAP is towards the mesh portal 130. The MAP 120A encrypts the payload/data portion of the packet using an encryption key shared with the next hop MAP 120B, and transmits the packet to the next hop MAP 120B. MAP 120B then receives the encrypted packet, determines what the next hop MAP 120C is towards the mesh portal 130, decrypts the packet using an encryption key that it shares with the MAP 120A, and encrypts the payload/data portion of the packet using the encryption key shared with the next hop MAP 120C, and transmits the packet to the next hop MAP 120C. The process of decrypting and then re-encrypting communications between MAPs at each hop is time-consuming and causes added latency. It is desirable to eliminate the need to perform decryption and re-encryption at each hop along the multi-hop mesh network 125 between the MAP 120A and the mesh portal 130.

Upon receiving the packet, a MAP can read information in the header to determine whether the packet is ultimately destined for a mesh node (MAP or MP). As such, to eliminate the need to decrypt the packet upon receipt by a MAP, the MAP can read the destination address, determine that the destination addresses corresponds to a mesh portal and that the packet is destined for a mesh portal, and forward the packet along a route towards the mesh portal without decrypting the packet and re-encrypting the packet with an encryption key it shares with the next hop MAP. One potential drawback of this approach is that it involves processing steps. Another drawback is that the MAP has no way of knowing whether the packet has been encrypted with an encryption key corresponding to the mesh portal, or if it is encrypted with an encryption key of the MAP that sent the packet as is usually the case. Yet another drawback with this approach is that there is no guarantee that all MAPs may not have "knowledge" of whether the destination addresses corresponds to or is associated with a mesh portal in which case this approach could fail.

Figure 2:
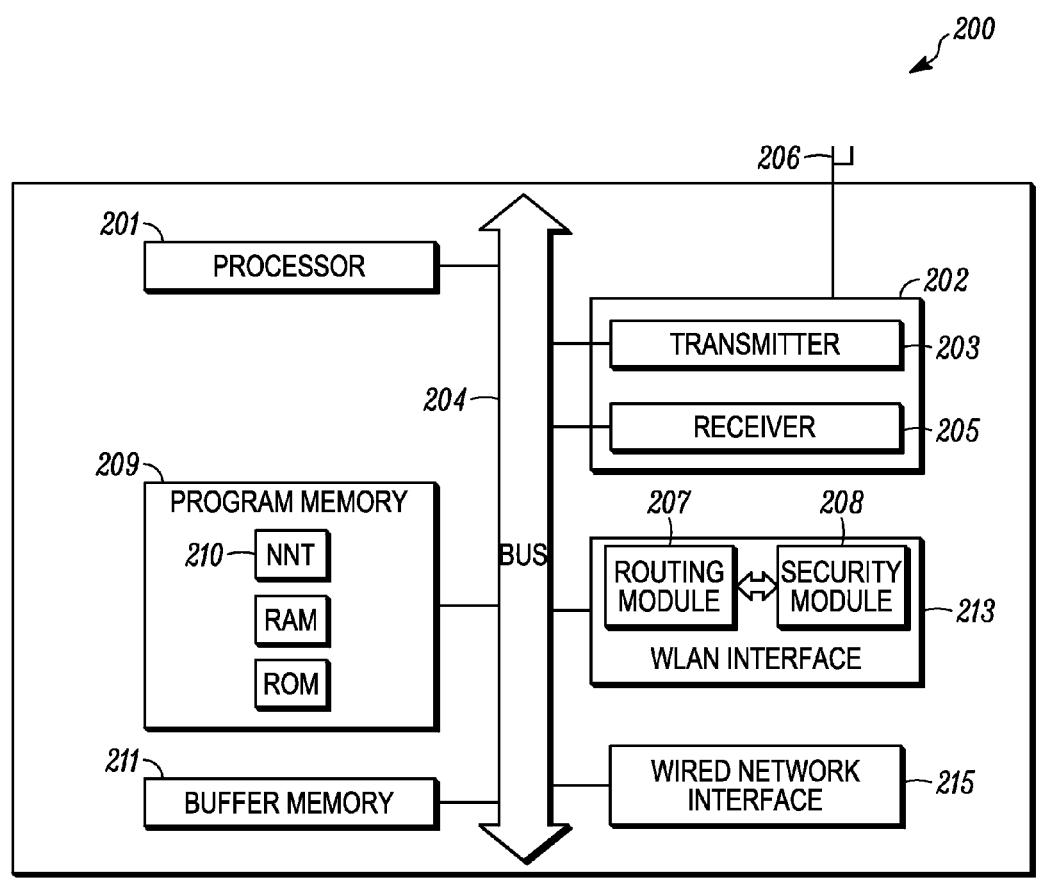
FIG. 2 is a simplified block diagram which illustrates a node in accordance with some embodiments of the present invention.

FIG. 2 is a simplified block diagram which illustrates an exemplary mesh node 200 (e.g., MAP or MP) according to one exemplary implementation. In the description that follows, the mesh node 200 will be referred to as a MAP 200; however, as described above, it will be appreciated that the mesh node 200 can also be a mesh portal if coupled to a wired connection. The MAP 200 comprises a processor 201, a transceiver 202 including a transmitter circuitry 203 and a receiver circuitry 205, an antenna 206, a program memory 209 for storing operating instructions that are executed by the processor 201, a buffer memory 211, and one or more communication interfaces including at least one wireless local area network (WLAN) interface 213 comprising a routing module 207 and a security module 208, and at least one wired network interface 415 (e.g., an IEEE 802.3 interface). Although not shown, the MAP 200 also can include an antenna switch, duplexer, circulator, or other highly isolative means (not shown) for intermittently providing information packets from the transmitter circuitry 203 to the antenna 206 and from the antenna 206 to the receiver circuitry 205. The MAP 200 is an integrated unit containing at least all the elements depicted in FIG. 2, as well as any other elements necessary for the MAP 200 to perform its particular electronic function. Alternatively, the MAP 200 can comprise a collection of appropriately interconnected units or devices, wherein such units or devices perform functions that are equivalent to the functions performed by the elements of the MAP 200.

The processor 201 includes one or more microprocessors, microcontrollers, DSPs (digital signal processors), state machines, logic circuitry, or any other device or devices that process information based on operational or programming instructions. Such operational or programming instructions are stored in the program memory 209. The program memory 209 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 201 has one or more of its functions performed by a state machine or logic circuitry, the memory 209 containing the corresponding operational instructions can be embedded within the state machine or logic circuitry. The operations performed by the processor 201 and the other elements of the MAP 200 are described in detail below.

The transmitter circuitry 203 and the receiver circuitry 205 enable the MAP 200 to communicate information packets to and acquire information packets from the other nodes. In this regard, the transmitter circuitry 203 and the receiver circuitry 205 include appropriate, conventional circuitry to enable digital or analog transmissions over a wireless communication channel. The transmitter circuitry 203 and the receiver circuitry 205 can operate over an ad hoc networking air interface (e.g., IEEE 802.11, IEEE 802.15, and the like).

The implementations of the transmitter circuitry 203 and the receiver circuitry 205 depend on the implementation of the MAP 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the MAP 200 or insertable into the MAP 200 (e.g., embodied in a wireless radio frequency (RF) modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. One of ordinary skill in the art will recognize that most, if not all, of the functions of the transmitter circuitry 203 and/or the receiver circuitry 205 can be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals from at least one frequency band and optionally multiple frequency bands. The receiver circuitry 205 can optionally comprise a first receiver and a second receiver, or one receiver capable of receiving in two or more frequency bands. The receiver 205, depending on the mode of operation, can be tuned to receive, for example, wireless local area network (WLAN), such as IEEE 802.11, communication signals. The transceiver 202 includes at least one set of transmitter circuitry 203. The at least one transmitter 203 can be capable of transmitting to multiple devices potentially in multiple frequency bands.

The antenna 206 comprises any known or developed structure for radiating and receiving electromagnetic energy in the frequency range containing the wireless carrier frequencies.

The buffer memory 211 can be any form of volatile memory, such as random access memory (RAM), and is used for temporarily storing received information packets in accordance with the present invention.

As illustrated in FIG. 2, the routing module 207 and the security module 208 are communicatively coupled. When a MAP detects the presence of a neighbor MAP within its communication range, for example, by receiving a management frame, beacon or other regularly transmitted or periodic message such as a presence message or HELLO message, the routing module 207 of the MAP 200 can add the neighbor MAP to a neighbor MAP table by populating the neighbor MAP table with information about the neighbor MAP. In one embodiment, in addition to performing routing functions, the routing module 207 may also control which neighbor MAPs and mesh portals the security module 208 establishes security associations with. In one exemplary embodiment, the routing module 207 can trigger establishment of security associations by the security module 208 based on attributes stored in the neighbor MAP table. Depending upon the implementation, some examples of some of the attributes stored in the neighbor MAP table include a neighbor MAP list, an active route list and a proxy list, and parameters such as Link Quality Measurements (LQMs) (which account for the quality of a wireless link with the particular neighbor MAP), routing metrics (which account for metrics along a route to the particular neighbor MAP), mobility domain information comprising a mobility domain value advertised by the particular neighbor MAP, mobility information about the particular neighbor MAP (e.g., fixed or mobile); and security association state information regarding whether or not a security association is already established with a neighbor MAP. The security module 208 can use any known protocol to establish a security association with the neighbor MAP. For example, in one implementation, the security module 208 can use the Extensible Authentication Protocol (EAP) to perform an 802.11i/EAPOL exchange to establish a security association between the MAP 200 and the neighbor MAP. In one implementation, if the MAP 200 and the neighbor MAP successfully establish security association, then the security module 208 informs the routing module 207 and a "security association-established-to-neighbor" flag is set in the neighbor list. After the security association is established, the routing module 207 of the MAP 200 can then establish a route between the MAP 200 and the neighbor MAP. Alternative or back-up routes can be quickly established using fast-handoff solutions for inter-mobility domain handoffs. This can be done a priori (e.g., establish parallel security associations) or the back-up security association(s) can be done at time of failure.

Figure 3A:
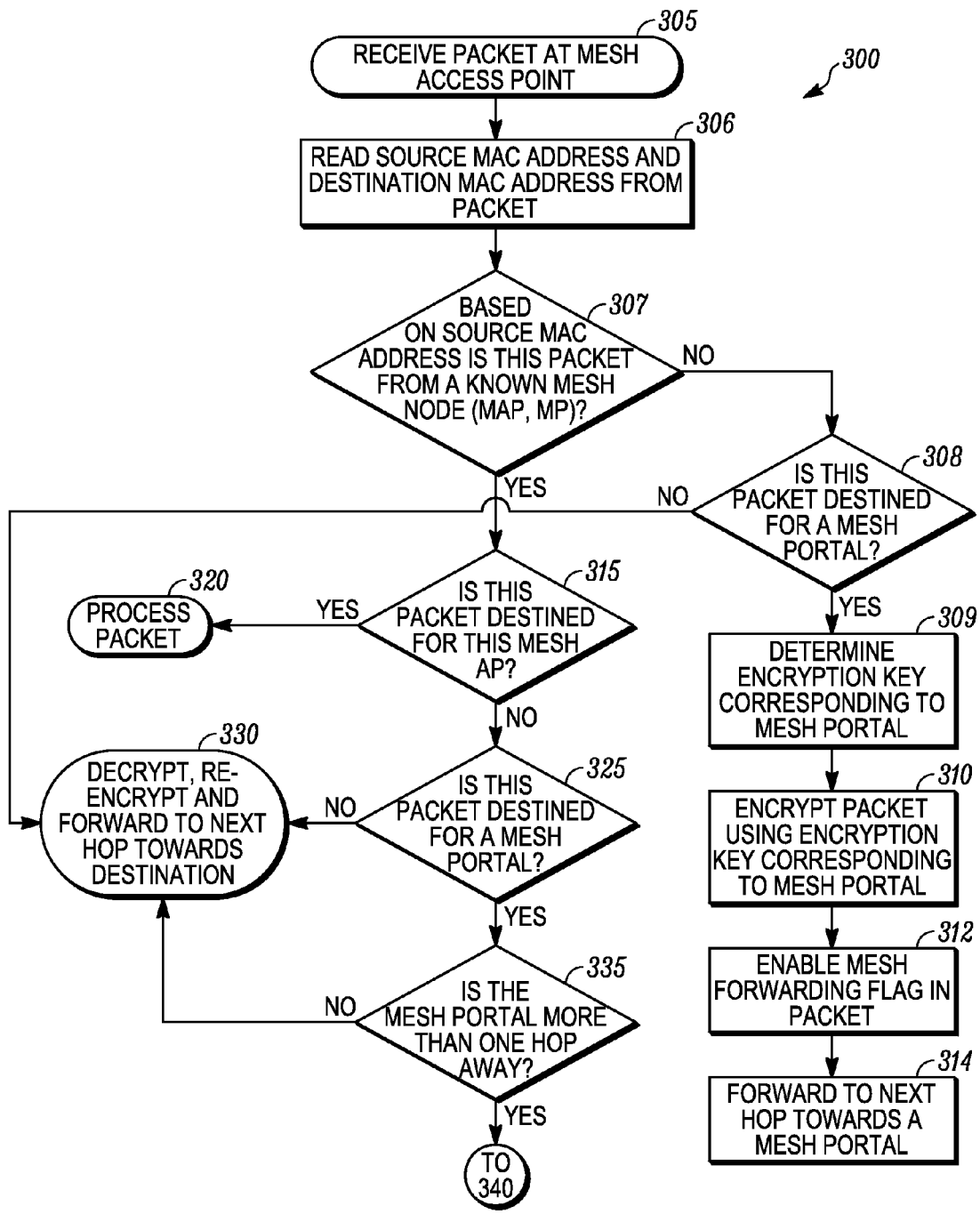
FIG. 3 is a flowchart illustrating a method for processing a packet at a mesh-enabled access point in accordance with some embodiments of the present invention.
Figure 3B:
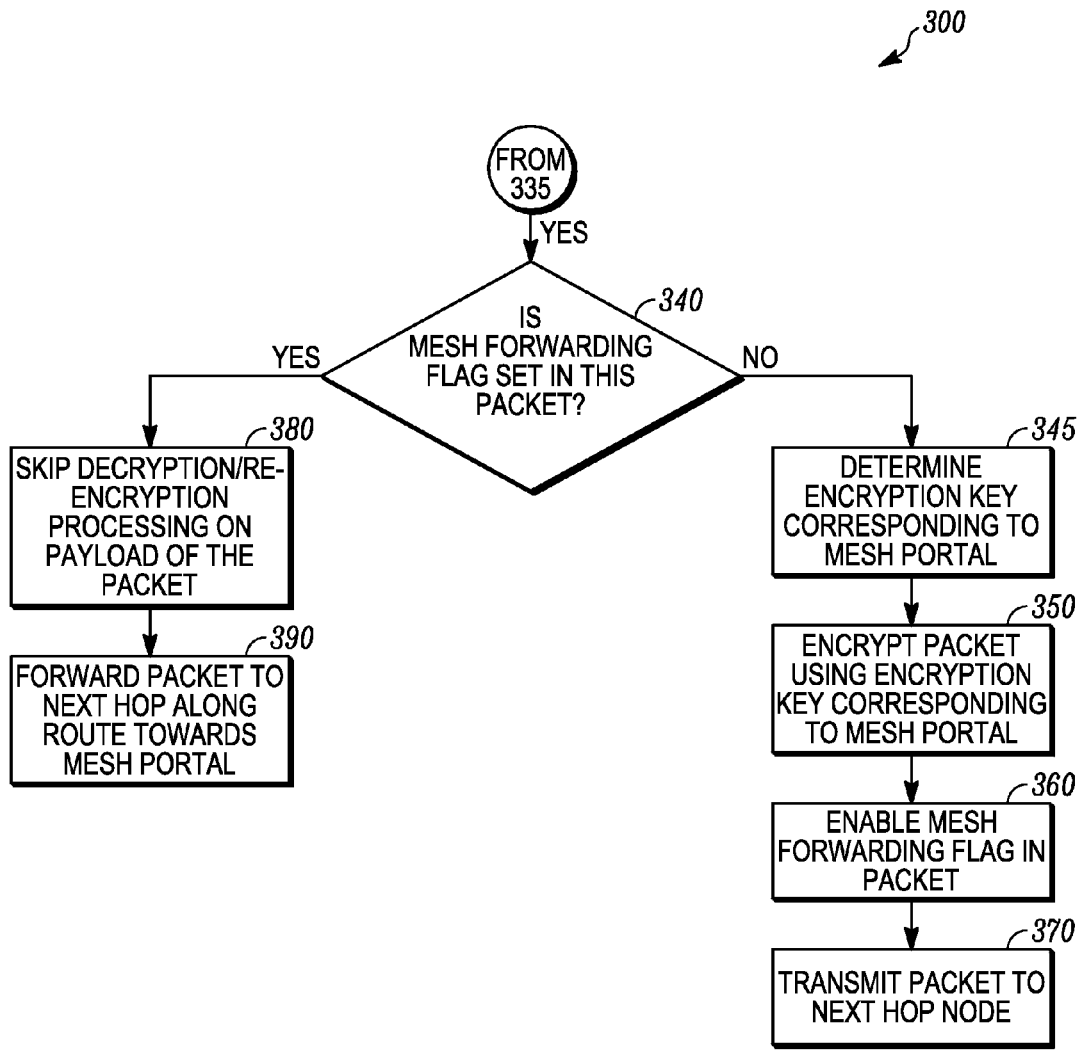

FIG. 3 is a flowchart illustrating a method 300 for processing a packet at a mesh-enabled access point (MAP) upon receiving the packet from any other node (i.e., non-mesh WLAN-enabled device, another MAP or MP) in accordance with some embodiments of the present invention. To differentiate a mesh-enabled access point that performs the processing in method 300 from other mesh-enabled access points in its mesh network, in the description of FIG. 3 that follows the mesh-enabled access point that performs the processing in method 300 is referred to as a first mesh-enabled access point (MAP). The first MAP can perform processing of method 300 to determine whether a mesh forwarding flag is already "set" in the packet or whether a mesh forwarding flag needs to be set in the packet. As used herein, the term "set" or variants thereof, such as "setting," when used to describe a flag can be interpreted to mean "enabled" or "inserted." In some implementations, a flag exists (i.e., is always present) in a packet and is either turned on or "enabled," left off or "disabled." In other implementations, a flag does not exist or "is not present" in a packet and needs to be inserted into the packet, and the flag can be enabled or disabled depending on the context.

The mesh forwarding flag indicates that the packet is destined for a mesh portal (or alternatively infrastructure devices coupled to the mesh portal via a wired link), is encrypted with an encryption key corresponding to the mesh portal, and is to be forwarded to the next hop mesh node without performing decryption/re-encryption processing on the packet (unless the recipient is the destination mesh portal). Throughout this document, when a packet is referred to as being destined for a mesh portal, this may also mean that the packet is destined for an external LAN, WAN or infrastructure device, entity, appliance, or LAN, etc. to which the mesh portal is coupled by a wired link, such as link 140, but that the packet will gain access to the infrastructure via a mesh portal. Any recipient mesh node that receives a packet can simply check to determine whether the mesh forwarding flag is set (e.g., enabled), and if so, can automatically interpret this as indicating that the packet is intended for a mesh portal (or alternatively infrastructure devices coupled to the mesh portal via a wired link), is encrypted with an encryption key corresponding to the mesh portal, and does not need to be decrypted/re-encrypted prior to transmitting it to the next hop node along the route to the destination mesh portal.

In some implementations, to improve mesh routing performance, the mesh forwarding flag may also comprise: information specifying one or more preferred routes/paths to the mesh portal. In a complex mesh network, multiple routes/paths between two mesh nodes can exist, and some of these are preferred in comparison to others since communication over the preferred routes/paths is more efficient. A routing module in the first MAP can calculate (or otherwise determine) different routes/paths between it and the mesh portal. This calculation can be relatively time-consuming. The routing module in the first MAP will determine that some of these routes/paths will be "better than" or "preferred in comparison to" other routes/paths. Each preferred route/path indicates a route/path the packet can take to the mesh portal. By including information specifying preferred routes/paths (to the mesh portal) in the mesh forwarding flag, the need for route/path calculations at each intermediate MAP (between the first MAP and the mesh portal) can be eliminated. When the mesh forwarding flag is enabled, an intermediate recipient MAP can simply select one of the preferred routes/paths specified in the mesh forwarding flag without calculating the route/path, and forward the packet to the next hop MAP towards the mesh portal. As such, when an intermediate MAP receives a packet that has the mesh forwarding flag enabled, the intermediate MAP not only determines that it should forward the packet as-is without performing decryption/re-encryption processing on the packet, but also knows one or more preferred routes/paths to the mesh portal without performing route/path calculations. If multiple routes/paths back to the mesh portal are specified, intermediate MAP can choose one of them. This further improves mesh routing performance.

The steps of the method 300 that are illustrated in FIG. 3 need not necessarily be performed in the order illustrated in FIG. 3, but can be in one exemplary implementation. In addition, many of the steps of the method 300 that are illustrated in FIG. 3 are optional, and need not be implemented in all implementations; however, each of the steps can be performed in one exemplary implementation.

At step 305, the first MAP receives a packet. As used herein, the term "packet" refers to is a formatted block of information carried by a network. A packet of fixed or variable length which has been encoded is also referred to as a frame. The terms "frame" and "packet" can be used interchangeably throughout this description. A packet can include the information illustrated in FIG. 4 except that the mesh forwarding flag 470 may not be included or "set" in all packets, such those transmitted or received from a non-mesh device (e.g., non-mesh WLAN-enabled device). A packet received from a non-mesh WLAN-enabled device can be a standard IEEE 802.11 packet. The header is unencrypted or "in the clear," while the payload or body of the packet can be either encrypted or unencrypted. A packet received from another mesh node will always have its payload encrypted with an encryption key that the transmitting node shares with the recipient node.

Upon receiving the packet, the first MAP can read information in the header to access information regarding: the immediate next hop node based on the receiver address 430 of the packet; the node presently forwarding/transmitting the packet based on the transmitter address 440 in the packet; the final recipient of the packet based on the destination address 450 of the packet, and the original source of the packet based on the source address 465 of the packet, etc. The first MAP can use this information to determine whether the packet is going to a mesh node (MAP or MP) or a non-mesh WLAN-enabled device, whether the packet is coming from a mesh node (MAP or MP) or a non-mesh WLAN-enabled device, whether the packet is ultimately destined for a mesh node (MAP or MP) or a non-mesh WLAN-enabled device and whether the packet is originally from a mesh node (MAP or MP) or a non-mesh WLAN-enabled device, etc.

In one implementation, the first MAP can read a source address of the packet and a destination address of the packet (at step 306), and can determine whether the packet is from a known mesh node (i.e., MAP or MP) based on the source address of the packet (step 307) and entries stored in its neighbor MAP table (described above). The term "address" can refer to a MAC address, an IP address, a BSSID, etc.

If source address of the packet indicates that the packet is not from a known mesh node (i.e., MAP or MP), then the first MAP presumes that the packet is from a WLAN-enabled client device, and method proceeds to step 308 where the first MAP can determine whether the packet is destined for a mesh portal (or alternatively infrastructure devices coupled to the mesh portal via a wired link) based on the destination address and entries stored in its neighbor MAP table (described above).

If the packet is not destined for a mesh portal (or other infrastructure), then the method 300 proceeds to step 330, which is described below.

If the packet is destined for a mesh portal (or alternatively infrastructure devices coupled to the mesh portal via a wired link), then the method 300 proceeds to step 309. At this point, the first MAP has determined that the packet is from a WLAN-enabled client device (i.e., is not from another mesh node) and is destined for a mesh portal (or infrastructure e.g., anything connected to mesh portal in a wired network such as a gateway device in the wired network, an external subnet outside the multi-hop mesh network 125). At step 309, the first MAP retrieves an encryption key corresponding to the mesh portal, and encrypts the packet using the encryption key corresponding to the mesh portal (step 310). At step 312, the first MAP sets a mesh forwarding flag 470, and at step 314 the first MAP forwards the packet to the next hop mesh node towards a mesh portal.

If the packet is from a known mesh node (i.e., MAP or MP), then method 300 proceeds to step 315, where the first MAP determines whether the packet is destined for the first MAP. When the packet is destined for the first MAP, the first MAP processes the data packet as indicated at step 320.

When the packet is not destined for the first MAP, the first MAP determines whether the packet is destined for a mesh portal (or alternatively an infrastructure device coupled to the mesh portal via a wired link) (step 325) based on entries in its neighbor MAP table (described above). In one implementation, the first MAP can determine whether the packet is destined for a mesh portal by determining if the destination address matches the destination address of a known mesh portal in its neighbor MAP table (described above). When the packet is not destined for a mesh portal (e.g., when the packet is destined for another MAP in the mesh network), the method 300 proceeds to step 330, where the first MAP decrypts the packet, re-encrypts the packet using the encryption key for the next hop node/MAP towards the destination, and forwards the re-encrypted packet to a next hop MAP towards the destination. The next hop node/MAP towards the destination could be, for example, another MAP in the mesh network.

When the packet is destined for a mesh portal, the method 300 proceeds to step 335, where the first MAP determines whether the mesh portal is more than one hop away based on entries stored in its neighbor MAP table (described above). If the mesh portal is not more than one hop away (i.e., the next hop from the first MAP is the mesh portal), the method 300 proceeds to step 330 (described above) so that the first MAP can properly encrypt the packet prior to transmitting it to the mesh portal.

If the mesh portal is more than one hop away, then the first MAP will have to relay the packet to another MAP along the route to the mesh portal, and the method 300 proceeds to step 340, where the first MAP determines whether a mesh forwarding flag 470 is set in the packet. The mesh forwarding flag will be set (e.g., enabled/present) in the packet if the first MAP receives the packet from another MAP, but will not be set (e.g., enabled/present) if the first MAP receives the packet from a non-mesh WLAN-enabled device. As mentioned above, the mesh forwarding flag indicates to the first MAP that the packet is intended or destined for a mesh portal, is encrypted with an encryption key corresponding to the mesh portal, and is to be forwarded to the next hop mesh node without performing decryption/re-encryption processing on the packet (i.e., without decrypting the packet, reencrypting the packet with a key that the first MAP has established with the next hop mesh node (e.g., MAP)). This way the first MAP can determine whether it can skip decryption, re-encryption, etc., and simply relay or forward the packet to the next hop mesh node.

When the mesh forwarding flag 470 is not set in the packet, the first MAP can assume that the packet is from a non-mesh WLAN-enabled device. The first MAP retrieves an encryption key corresponding to the mesh portal (at step 345), and encrypts the packet using the encryption key corresponding to the mesh portal (step 350). The first MAP also sets a mesh forwarding flag 470 in the packet at step 360 and, at step 370, forwards the packet to the next hop mesh node towards the mesh portal. To any recipient MAP, the mesh forwarding flag indicates that the packet is destined for a mesh portal, is already encrypted with an encryption key corresponding to the mesh portal, and is to be forwarded to the next hop mesh node without performing decryption/re-encryption processing on the packet.

When the first MAP determines that the mesh forwarding flag 470 is set in the packet (at step 340), the first MAP can skip decryption/re-encryption processing on payload of the packet (at step 380) and forward the packet to the next hop mesh node towards the mesh portal (step 390). Upon receiving the packet, the next hop mesh node towards the mesh portal may then perform processing in steps 306, 307, 315, 325-340, 380 and 390.

Although not illustrated in FIG. 3, a MAP that originates a packet that is to be transmitted to a mesh portal (or alternatively infrastructure devices coupled to the mesh portal via a wired link) will set a mesh forwarding flag. In addition, when a mesh portal receives a packet that is destined for a WLAN enabled client device, the mesh portal can set a mesh forwarding flag so that any MAP along the route between the mesh portal and the WLAN enabled client device can skip decryption, re-encryption, etc., and simply relay or forward the packet to the next hop mesh node along the route between the mesh portal and the WLAN enabled client device; the final MAP which is directly communicating with the WLAN enabled client device can then remove the mesh forwarding flag, and send a standard IEEE 802.11 packet to the WLAN enabled client device.

Figure 4:
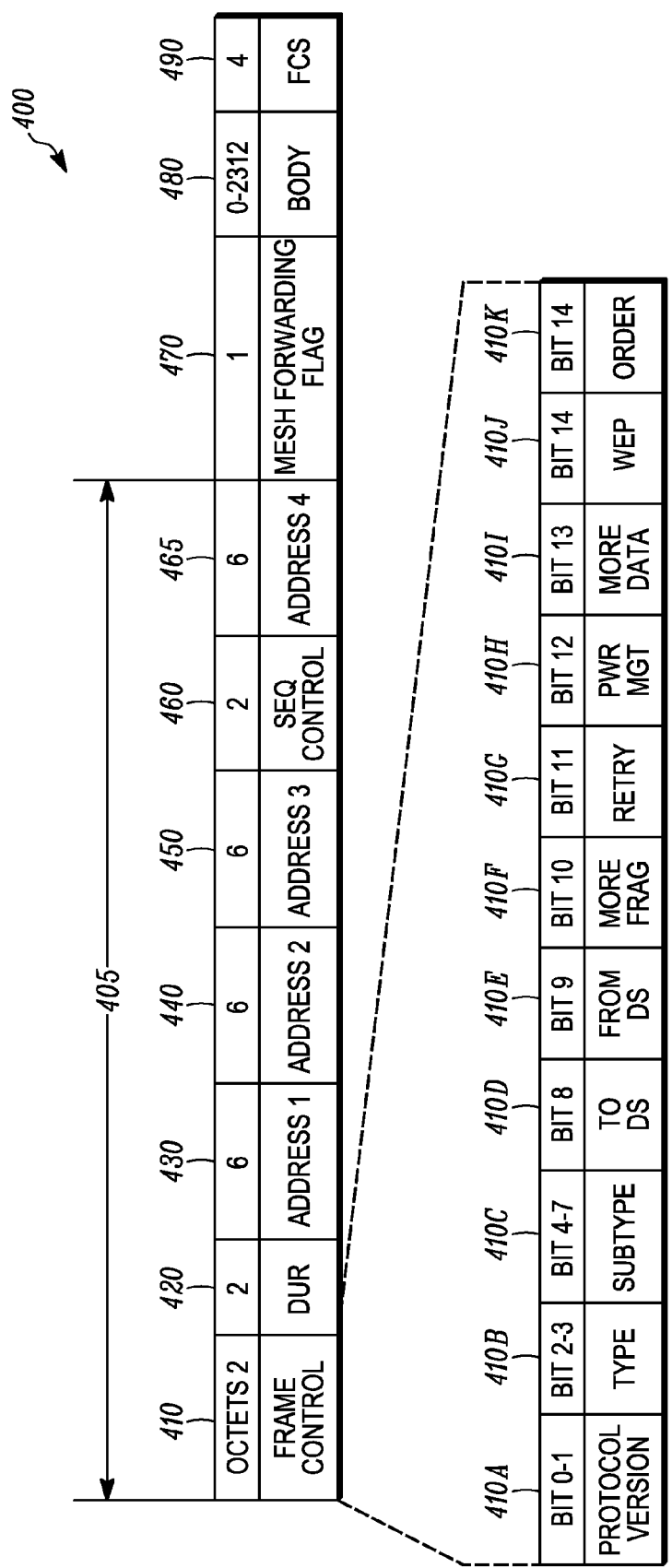
FIG. 4 is a data structure which illustrates a data packet format in accordance with some embodiments of the present invention.

FIG. 4 is a data structure which illustrates a data packet 400 format that comprises a MAC header 405, a mesh forwarding flag 470, a packet body field 480 that comprises data or "payload" information, and a frame check sum (FCS) field 490.

The MAC header 405 comprises a frame control field 410, a duration field 420, address fields 430, 440, 450, 465, and a sequence control field 460.

The frame control field 410 comprises a protocol version sub-field 410A, a type sub-field 410B, a subtype sub-field 410C, a ToDS bit 410D, a FromDS bit 410E, a more fragment bit 410F, a retry bit 410G, a power management bit 410H, a more data bit 410I, a WEP bit 410J and an order bit 410K. The duration field 420 contains a duration time value that is proportional to the length of the packet in bits. The frame control field 410 and the duration field 420 are well-known by those skilled in the art and will not be described in further detail herein.

The address fields comprise a receiver address field 430, a transmitter address field 440, a destination address field 450, and a source address field 465. The address fields 430, 440, 450, 465 each comprise a 48-bit IEEE MAC identifier. The address fields 430, 440, 450, 465 can be utilized for identifying MAC addresses associated with the routing of various communication packets. When four address fields 430, 440, 450, 465 are used packets can be forwarded in a multihop scenario. Two of these address fields 430, 440 can be used to identify the immediate next hop node and the node presently forwarding the packet. The other two address fields 450, 465 are used to identify the final destination and original source of the packet.

The receiver address field (Address 1) 430 can be a MAC address which indicates which station should process the packet. If the receiver is a station, then the receiver address field (Address 1) 430 is the destination address. If the packets are destined to a node connected to an access point via a wired link, then the receiver address field (Address 1) 430 is the wireless interface in the access point, and the destination address may be a router attached to the Ethernet. The receiver address field (Address 1) 430 may be either the unicast address of the node that is the immediate intended receiver of the packet or the multicast or broadcast address of the nodes that are the immediate intended receivers of the packet. A node uses the contents of the receiver address field 430 to perform address matching for receive decisions. For groupcast traffic, the receiver address field (Address 1) 430 carries the groupcast address (including broadcast and multicast address).

The transmitter address field (Address 2) 440 can be the MAC address of the node (that is transmitting the packet (e.g., identifies the MAC address used by the wireless interface in the AP or in the context of wireless bridging identifies the wireless interface that transmitted the packet onto the wireless medium). A node uses the contents of the transmitter address field (Address 2) 440 to direct an acknowledgment if acknowledgment is necessary. When a MAP generates by itself or forwards group traffic for non-routable station associated with it, the transmitter address field (Address 2) 440 carries the MAC address of the transmitting MAP.

The destination address field (Address 3) 450 can be the MAC address of the final recipient of the data carried in the packet body field 480 (e.g., the station that will hand the packet to the higher protocol layers for processing). For groupcast traffic, the destination address field (Address 3) 450 of the WDS mesh data packet 400 is same as the receiver address field (Address 1) 430 carrying the groupcast address and is therefore duplicate information.

The source address field (Address 4) 465 is included in Wireless Distribution System (WDS) type data packets to allow for multi-hop communication. The source address field (Address 4) 465 can be a MAC address that identifies the original source node of the transmission (i.e., the MAC address of the node that generated the data carried in the packet body field 480).

The sequence control field 460 value is set by transmitter to permit the receiver to correctly process received packets by placing received packets in the order in which they were sent and to eliminate duplicate received packets. The sequence control field 460 value comprises a 4-bit fragment number field and a 12-bit sequence number field. The sequence control field 460 value can be used for both defragmentation and discarding duplicate packets. The mesh forwarding flag 470 is described above. The body field 480 comprises data or "payload" information. The body field 480 moves the higher-layer payload from station to station. The FCS field 490 contains a cyclic redundancy check (CRC) which allows stations to check the integrity of the received packets and to detect errors in the packet which may have occurred during transmission. The FCS field 490 is calculated over the MAC header 405 and the packet body field 480.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for processing a packet received by a first mesh-enabled access point (MAP), the method comprising:
   receiving a packet at the first mesh-enabled access point;
   reading a source address of the packet and a destination address of the packet;
   determining, based on the source address of the packet, whether the packet is from a known mesh node that the first MAP has previously discovered; wherein
   if the packet is from a known mesh node:
      determining whether a mesh forwarding flag is set in the packet, wherein the mesh forwarding flag indicates that the packet is destined for a mesh portal having a wired connection to an external network, and is to be forwarded to a next hop MAP without performing decryption/re-encryption processing on the packet;
      skipping decryption/re-encryption processing on the packet when the mesh forwarding flag is set in the packet; and
      forwarding the packet to the next hop MAP towards the mesh portal, and
   if the packet is not from a known mesh node:
      determining, based on the destination address, whether the packet is destined for the mesh portal; whereupon
      retrieving an encryption key corresponding to the mesh portal when the mesh forwarding flag is not set in the packet;
      encrypting the packet using the encryption key corresponding to the mesh portal;
      setting a mesh forwarding flag in the packet; and
      forwarding the packet to the next hop MAP towards the mesh portal.

2. A method according to claim 1, wherein if the packet is from a known mesh node, further comprising:
   determining whether a mesh forwarding flag is not set in the packet, whereupon
      retrieving an encryption key corresponding to the mesh portal;
      encrypting the packet using the encryption key corresponding to the mesh portal; and
      setting a mesh forwarding flag in the packet.

3. A method according to claim 1, wherein if the packet is from a known mesh node, further comprising:
   determining whether the packet is destined for the first MAP; whereupon
      processing the data packet at the first MAP when the packet is destined for the first MAP;

otherwise:
  determining whether the packet is destined for the mesh portal when the packet is not destined for the first MAP; whereupon
  decrypting the packet when the packet is not destined for a mesh portal, re-encrypting the packet using an encryption key of a next hop MAP towards the destination, and
  forwarding the re-encrypted packet to the next hop MAP towards the destination.

4. A method according to claim 1, wherein if the packet is from a known mesh node, further comprising:
  determining whether the mesh portal is more than one hop away when the packet is destined for a mesh portal.

5. A method according to claim 1, further comprising:
  removing the mesh forwarding flag by the last mesh access point on a route from a source to a destination.

6. A method according to claim 1, wherein the mesh forwarding flag also comprises information regarding a preferred route to the mesh portal.

7. A mesh-enabled access point (MAP), comprising:
  a receiver operable to receive a packet;
  a transmitter operable to transmit packets;
  a security module of a wireless local area network interface operable to provide decryption/re-encryption processing on the packet;
  a routing module of a wireless local area network interface operable to read a source address of the packet and a destination address of the packet, and determine, based on the source address of the packet, whether the packet is from a known mesh node that the MAP has previously discovered; wherein
  if the packet is from a known mesh node:
    the routing module is further operable to determine whether a mesh forwarding flag is set in the packet, wherein the mesh forwarding flag comprises: information regarding a preferred route to a mesh portal including a next hop MAP, and information which indicates that the packet is destined for a mesh portal having a wired connection to an external network, and is to be forwarded to the next hop MAP without performing decryption/re-encryption processing on the packet, wherein the routing module instructs the security module to skip decryption/re-encryption processing on the packet when the routing module determines that the mesh forwarding flag is set in the packet; and directs the transmitter to forward the packet to the next hop MAP towards the mesh portal, and
  if the packet is not from a known mesh node:
    the routing module is further operable to determine, based on the destination address, whether the packet is destined for the mesh portal, whereupon the routing module instructs the security module to retrieve an encryption key corresponding to the mesh portal when the mesh forwarding flag is not set in the packet and encrypt the packet using the encryption key corresponding to the mesh portal, whereupon the routing module is further operable to set a mesh forwarding flag in the packet.

8. A communication network, comprising:
  a first mesh-enabled access point (MAP) operable to receive a packet;
  a mesh portal having a wired connection to an external network that is a destination of the packet;
  at least one next hop MAP that is one communication hop away from the first MAP along a communication route between the first MAP and the mesh portal,
  wherein the first MAP is operable to receive a packet, read a source address of the packet and a destination address of the packet, and determine, based on the source address of the packet, whether the packet is from a known mesh node that the first MAP has previously discovered; wherein
  if the packet is from a known mesh node:
    the first MAP can determine whether a mesh forwarding flag is set in the packet, wherein the mesh forwarding flag comprises information regarding a preferred route to a mesh portal including a next hop MAP and information which indicates that the packet is destined for a mesh portal and is to be forwarded to the next hop MAP without performing decryption/re-encryption processing on the packet, wherein the first MAP is operable to skip decryption/re-encryption processing on the packet when the first MAP determines that the mesh forwarding flag is set in the packet, and to transmit the packet to the next hop MAP towards the mesh portal, and
  if the packet is not from a known mesh node:
    the first MAP can determine, based on the destination address, whether the packet is destined for the mesh portal, whereupon the first MAP can retrieve an encryption key corresponding to the mesh portal when the mesh forwarding flag is not set in the packet, encrypt the packet using the encryption key corresponding to the mesh portal, set a mesh forwarding flag in the packet, and forward the packet to the next hop MAP towards the mesh portal.

\* \* \* \* \*